Figure 1:
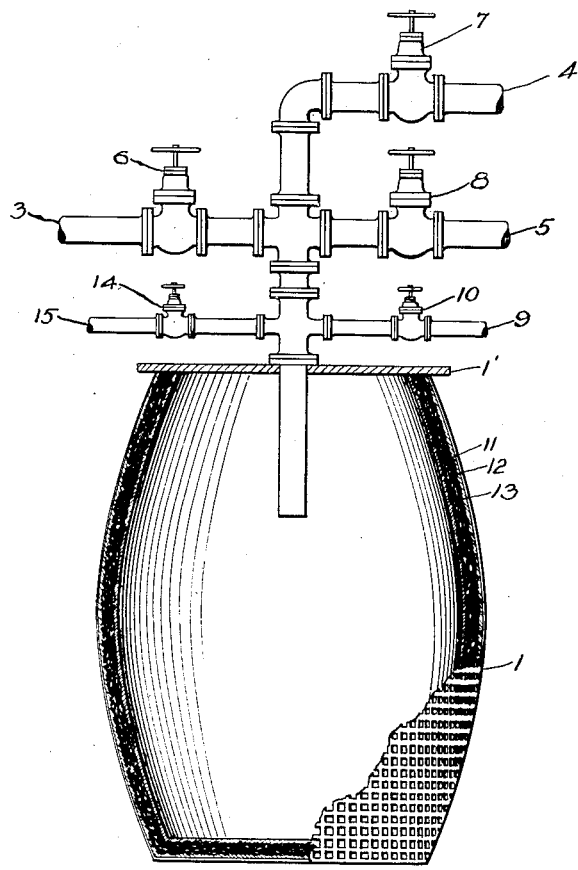

R. P. PERRY.
MOLDED ARTICLE IN LAMINATED FORM AND PROCESS OF MAKING THE SAME.
APPLICATION FILED SEPT. 29, 1917.

1,386,276. Patented Aug. 2, 1921.

INVENTOR
Ray P. Perry
BY
Edward M. Evarts
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF WEST VIRGINIA.

MOLDED ARTICLE IN LAMINATED FORM AND PROCESS OF MAKING THE SAME.

1,386,276.   Specification of Letters Patent.   Patented Aug. 2, 1921.

Application filed September 29, 1917. Serial No. 193,984.

*To all whom it may concern:*

Be it known that I, RAY P. PERRY, a citizen of the United States, residing at Upper Montclair, in the county of Essex and State of New Jersey, have invented certain new and useful Improvements in Molded Articles in Laminated Form and Processes of Making the Same, of which the following is a specification.

This invention relates to a method of producing articles having a laminated structure and to such articles themselves, particularly such articles as are initially of a porous nature and are designed to be subsequently saturated with a waterproofing material generally, but not necessarily, of a bituminous nature.

One of the objects of my invention is to provide a process whereby such articles may be readily and conveniently produced, the articles themselves possessing in their finished form superior mechanical and waterproofed properties. In producing the article by my process, I use a foraminous mold usually sectional, the inner dimensions of which correspond to the outer shape of the article which it is desired to produce. Communicating with the interior of this mold is an inlet with which are connected several, generally three, valve controlled inlets for admitting the materials to be used in the production of the article by my process, and also for admitting the drying medium which is used at one stage of my process. The valve controlled inlets are so manipulated that there is first admitted into the mold material consisting substantially of the usual and ordinary paper-making stock except that I may, if desired, add to such stock a small percentage of comminuted fusible waterproofing material, though not in sufficient quantities to permit the material when acted upon by the source of heat subsequently described to adhere to the inner face of the mold. Enough of this material is admitted to form a thin coherent lining on the inside of the mold. Thereafter the inlet admitting this material to the mold is closed by means of its valve, and the valve of the inlet which admits the paper-forming material having incorporated therein a comparatively high percentage of comminuted fusible waterproofing material is opened. The opening of this last mentioned inlet admits to the mold a comparatively large quantity of moldable material consisting of a watery pulp of paper-making stock to which has been added a comparatively large quantity of comminuted fusible waterproofing material, generally of a bituminous nature, such as pitch or asphalt, and preferably in the form of fine hairs, threads or filaments. The material first admitted to the mold is also in the form of a watery pulp of paper-making material, differing from the second mentioned material essentially that it contains none or only a comparatively small percentage of the comminuted fusible waterproofing material. In this way there is formed within the mold and adjacent the first mentioned layer a second layer, considerably thicker than the first layer, and containing a much higher percentage of waterproofing material in solid comminuted form incorporated therein. In fact, if so desired, the second layer may consist substantially entirely of solid comminuted fusible waterproofing material. If so desired further alternate layers of material containing none or only a small percentage, and material containing a large percentage of waterproofing material may be superimposed upon the first mentioned layers. However, two layers are usually sufficient as already described, although I prefer for the purpose of giving the finished article added mechanical strength to add a third layer of material similar to that of which the first layer is composed, that is, of a paper-making material containing none or only a small percentage of solid comminuted fusible waterproofing material incorporated therein.

The water in the pulp is driven out by the pressure of the fluid behind it through the openings in the foraminous mold. A large part of the water content of the molded article, at this stage of the process, may be driven off by passing air, either hot or cold, under pressure through the mold. After the required number of layers have been formed within the mold, superheated steam may be admitted to the cavity of the mold and the passage of such steam through the successive layers within the mold serves to dry the article and to slightly fuse the particles of waterproofing material, thereby causing the various layers to be firmly cemented together.

Thereafter the article formed as above described is removed from the mold, the operation of removing the article being comparatively easy since the outer layer contains substantially none, or only very little, waterproofing material which is generally of a fusible and adherent nature. If steam or other heating means have not been used, the article may be air or kiln dried. If desired the article thus formed may be further waterproofed by immersing the same in a bath of liquid or molten waterproofing material.

Figure 2:
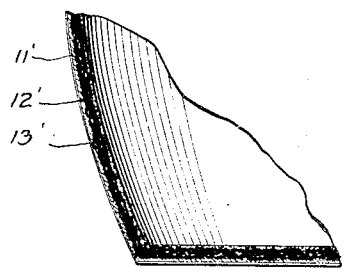

Referring to the drawing, Figure 1 is a diagrammatic cross-sectional view of a device for carrying out my process, and Fig. 2 is a detail view of a modification.

Referring to Fig. 1, 1 indicates the mold which is made of foraminous material and is in the present instance, by way of example, shaped so as to produce a barrel. Fitting over the top of the foraminous mold 1 is a cover member 1' into which fits the inlet pipe 2 with which communicate the five passages 3, 4, 5, 9 and 15 controlled by the valves 6, 7, 8, 10 and 14, respectively. While the inlet 9 controlled by the valve 10 may be employed for the purpose of admitting superheated steam to the mold cavity, and the inlet 11 controlled by the valve 12 may be employed for the purpose of admitting hot or cold air to the mold cavity, the inlets 3, 4 and 5 are for admitting the various watery pulps comprising the materials of which the laminated article is to be made. For example, the tube 3 may admit a watery pulp of paper-making material containing little or substantially no comminuted fusible waterproofing material incorporated therein. The same may be true of the tube 5. The tube 4, on the other hand, admits a watery pulp containing a comparatively large percentage of comminuted fusible waterproofing material intermixed therewith. By way of example, such material may consist of bituminous material in solid comminuted form, as pitch or asphalt, and preferably in filamentary form.

In operation, the valve 6 of the tube 3 is opened to admit a watery pulp in the form of a paper-making material containing little or no comminuted fusible waterproofing material. Enough of this material is admitted to form a thin compact layer 11 of the same, lining the inner face of the mold 1. The valve 6 is then closed and the valve 7 is opened, thereby admitting to the mold cavity 1 a comparatively large quantity of watery pulp containing paper-making material having mixed therein a substantially large quantity of comminuted fusible waterproofing material. When a sufficiently thick layer 12 of such material has been formed in contact with the first layer 11 the valve 7 is closed. While the two layers 11 and 12 already described are generally sufficient for the production of the article made by the process of my invention, I prefer to form a further layer 13 of material similar in its nature to the material of which the layer 11 is formed. This layer 13 is formed against the layer 12 and is, as compared with such layer 12, comparatively thin. The layer 13 is formed by opening the valve 8 thereby admitting through the tube 5 a watery pulp containing of paper-making material having little or substantially no comminuted fusible waterproofing material mixed therein.

After the several layers have been formed as above described, and the water accompanying the various watery pulps has been permitted to drain off through the pores of the several layers and through the openings of the foraminous mold 1, the valve 12 of the air inlet tube 11 may be opened admitting to the mold cavity a quantity of hot or cold air under pressure, the air serving to expel a large part of the water present in the layers. Or else the valve 10 of the steam inlet tube 9 may be opened, admitting to the mold cavity a quantity of superheated steam which serves, both, to dry out the moisture present in the several layers and to partially fuse the solid comminuted fusible waterproofing material present in one or more of the layers thereby causing the several layers, to be cemented together in a substantially water-free condition. In some cases it may be desirable to pass superheated steam through the mold after the air, either hot or cold, has been used. Where neither air, nor steam, nor the combination of the two, has been employed, or where these agencies have not been employed sufficiently to thoroughly dry the articles, such articles may be dried either in a heated kiln or spontaneously by evaporation. Where the drying is accomplished spontaneously, or by the use of cold air, or in a kiln, the layer 11 may be omitted.

The article so formed may, if desired, be further waterproofed by immersing the same in a bath of liquid or molten waterproofing material, preferably of a bituminous nature, such as molten pitch or asphalt. The percentage of comminuted solid fusible waterproofing material present in the layers 11 and 13 should be so low that there will be no danger upon the application of the heat in the superheated steam that the layers will become adherent enough to adhere to the mold 11 or other articles placed in contact therewith. The amount of solid comminuted fusible waterproofing material present in the layer 12 may be as high as desired, for example, 90%, or higher, though this percentage may be varied at will.

By the above method I am enabled to produce a waterproofed laminated article possessing superior mechanical and waterproofed properties since the central layer 12, for example, contains already incorporated therein a large amount of waterproofing material, while the outer layers 11 and 13, containing little or none of such material, may be made coherent and will serve therefore to give the article the desired mechanical strength. Where the laminated container of my invention is intended to contain an adherent substance such as pitch, it may be desirable to line the inner surface of the article with a finely divided non-adherent material, preferably of a mineral substance, such as finely divided clay. This type of construction is illustrated in Fig. 2, where 11' indicates the outer layer making up the article. This layer, which consists of material containing none or only a small percentage of comminuted, fusible, waterproofing material, such as pitch or asphalt, and preferably in filamentary form, may be omitted where the drying of the molded article is accomplished by cold air, or spontaneously by evaporation, or in a heated kiln, that is, by any means other than the passage of a hot fluid through the mold. Adjacent the layer 11', where such a layer is used, is the layer 12' consisting of a material containing a large percentage, or consisting entirely of comminuted, fusible, waterproofing material, such as pitch or asphalt, and preferably in filamentary form. The layer 13' lining the inner surface of the article is a thin layer of finely-divided, non-adherent material, preferably of a mineral substance, such as clay. The layer 13' may be applied by admitting through the tube 5, for example, a quantity of finely-divided clay suspended in water. The article thus formed may be dried in any of the ways previously described. In any case the material of the layers may be uniformly distributed by rapidly rotating the mold, the rotation being accomplished by any desired means and serving not only to distribute the pulpy materials in uniform layers, but also to drive out by centrifugal force some of the water contained in the layers.

What I claim is:

1. The process of producing articles of the character described, which comprises the steps of forming upon a foraminous surface a layer of moldable material containing none or only a comparatively small percentage of comminuted fusible waterproofing material conforming to the shape of the article desired to be produced, and forming adjacent to said first-mentioned layer a second layer containing a comparatively large percentage of comminuted fusible waterproofing material, and subsequently immersing the articles in a bath of waterproofing material.

2. A molded article containing a layer of material containing fusible waterproofing material in filamentary form and a layer of fibrous material comparatively free from fusible waterproofing material.

3. A molded article containing a layer of material containing fusible bituminous material in filamentary form, and a layer of fibrous material comparatively free from fusible bituminous material.

4. A molded article containing a layer of material containing a high percentage of fusible bituminous material, and a layer of material comparatively free from fusible bituminous material.

5. A molded, laminated article in the form of a receptacle having a layer containing a high percentage of fusible waterproofing material in filamentary form, and a comparatively thin layer of comminuted non-adherent material covering the interior of the receptacle.

6. A molded, laminated article in the form of a receptacle having a layer containing a high percentage of fusible waterproofing material in filamentary form, a layer of material containing none or only a small percentage of fusible waterproofing material in filamentary form covering the exterior of the receptacle, and a comparatively thin layer of comminuted non-adherent material covering the interior of the receptacle.

7. A molded, laminated article in the form of a receptacle having a layer containing a high percentage of fusible bituminous material in filamentary form, and a comparatively thin layer of comminuted non-adherent material covering the interior of the receptacle.

8. A molded, laminated article in the form of a receptacle having a layer containing a high percentage of bituminous material in filamentary form, a layer of material containing none or only a small percentage of fusible bituminous material in filamentary form covering the exterior of the receptacle, and a comparatively thin layer of comminuted non-adherent material covering the interior of the receptacle.

In testimony whereof I affix my signature.

RAY P. PERRY.